United States Patent
Engelberth

(10) Patent No.: US 8,611,708 B2
(45) Date of Patent: Dec. 17, 2013

(54) OPTICAL APPARATUS HAVING IMPROVED RESISTANCE TO THERMAL DAMAGE

(75) Inventor: Jon W. Engelberth, Denville, NJ (US)

(73) Assignee: LGS Innovations LLC, Florham Park, NJ (US)

(*) Notice: Subject to any disclaimer, the term of this patent is extended or adjusted under 35 U.S.C. 154(b) by 452 days.

(21) Appl. No.: 12/949,091

(22) Filed: Nov. 18, 2010

(65) Prior Publication Data
US 2012/0128299 A1 May 24, 2012

(51) Int. Cl.
G02B 6/26 (2006.01)
G02B 6/42 (2006.01)

(52) U.S. Cl.
USPC ............................................. 385/28; 385/31

(58) Field of Classification Search
None
See application file for complete search history.

(56) References Cited

U.S. PATENT DOCUMENTS

| | | | |
|---|---|---|---|
| 6,011,886 A * | 1/2000 | Abramov et al. | 385/37 |
| 7,010,204 B2 | 3/2006 | Reith et al. | |
| 7,215,860 B2 | 5/2007 | Engelberth et al. | |
| 7,306,376 B2 | 12/2007 | Scerbak et al. | |
| 7,426,325 B2 | 9/2008 | Scerbak et al. | |
| 2008/0085087 A1 * | 4/2008 | Dimmick et al. | 385/123 |

* cited by examiner

*Primary Examiner* — Tina Wong
(74) *Attorney, Agent, or Firm* — M. I. Finston; N. Desai

(57) ABSTRACT

An optical assembly is provided that can mitigate thermal damage that could otherwise occur in the region near where the optical fiber emerges from a high-power optical device package. The optical assembly includes an optical medium to guide stray light, along the fiber axis but substantially outside of the fiber core, from the interior to the exterior of a housing. The assembly further includes a transition region external to the housing, where at least one optical mode guided by the optical medium transitions to at least one optical mode confined by a polymer coating as a guided mode of the cladding. In embodiments, the optical medium is provided by the fiber cladding together with overlying materials of relatively low refractive index that help to confine the stray light within the cladding.

10 Claims, 2 Drawing Sheets

OPTICAL APPARATUS HAVING IMPROVED RESISTANCE TO THERMAL DAMAGE

ACKNOWLEDGEMENT OF GOVERNMENT SUPPORT

The U.S. Government has a paid-up license in this invention and the right in limited circumstances to require the patent owner to license others on reasonable terms as provided for by the terms of Contract No. FA9451-08-D-0194 awarded by the United States Department of Defense.

FIELD OF THE INVENTION

The invention relates to optical assemblies of the kind in which an optical fiber guides light exiting an optical device package.

ART BACKGROUND

Optical fiber has long been recognized as a useful medium for communication signals. With the growth of traffic demand on optical networks, and with the advance of communication technologies such as free-space optical communication, there has been a need for optical fiber devices to handle signals at ever greater levels of optical power.

With increasing power, however, comes increasing danger that unconfined light will escape from the fiber and heat materials and components beyond their damage thresholds. This may occur, for example, when light that is nominally end-coupled into a propagating core mode of an optical fiber is partially injected, as stray light, into the fiber cladding. At an optical discontinuity as might occur, for example, where a pigtail fiber emerges from a device package, the stray light can escape from the cladding into the surrounding material, where it is absorbed to create a potentially destructive hot spot.

For example, FIG. 1 shows an illustrative optical assembly in which housing 10 contains a diode laser 20 powered through electrical connector 30. Laser 20 emits light into refractive optics 40 (shown symbolically in the figure as a convex lens), from which the light is focused onto an end of optical fiber 50. More specifically, the light is focused onto a spot that is sufficiently small, and with a sufficiently small entrance angle into the fiber, that most of the light is captured by the fiber core, where it excites one or more propagating core modes of the fiber.

It should be noted in this regard that the representation of a laser diode is merely illustrative and not limiting. Other optical devices in regard to which the invention may usefully be employed include, without limitation, switches, attenuators, modulators, time-delay buffers, filters, polarizers, isolators, circulators, couplers, wavelength demodulators, taps, and amplifiers.

With further reference to FIG. 1, a ferrule 60 is typically used to facilitate the positioning and alignment of fiber 50. As seen in the figure, ferrule 60 passes through a wall of housing 10, so that one end face is situated within the housing, and the other end face is situated outside the housing. The end face of fiber 50 is typically flush with the inward face of the ferrule, and the fiber passes through the outward face of the ferrule and extends further downstream.

Also shown in FIG. 1 is a cladding mode optical power stripper 70, sometimes also referred to as a light dump. The purpose of stripper 70 is to remove stray light that has been inadvertently injected into propagating cladding modes due to misalignment, mechanical perturbations, and the like. Typically, strippers of this kind will be used when at least the inner polymer coating of a fiber is a low index coating. (In fibers with high-index coatings, by contrast, the stray light tends to couple out of the cladding modes into the polymer coating, where it is absorbed.) Low-index coatings are typically encountered in cladding pumped amplifier fibers and in the passive fibers that lead from pump-light couplers to such amplifier fibers. (An alternative, most useful when only a few watts of stray optical power have been coupled into cladding modes, is to strip a short section of fiber, recoat it with a high-index polymer, and add a heat sink.) Optical power strippers are commercially available, and their use is well known.

As noted above, the location where a pigtail fiber emerges from an optical device package is particularly subject to thermal damage due to stray light. Such a location is indicated in FIG. 1 by circle 80. As will be understood from the figure, power stripper 70 is situated some distance downstream, and therefore is unable to protect the optical fiber from damage in the region indicated by circle 80.

SUMMARY OF THE INVENTION

I have provided a new optical assembly that is able to mitigate thermal damage that could otherwise occur in the region near where the optical fiber emerges from the device package.

In an embodiment, my new optical assembly comprises a housing and an optical fiber that has a longitudinal axis and that extends from the interior to the exterior of the housing. The optical fiber has a core and a cladding surrounding the core. The cladding may be constituted by a single layer of glass, or it may have several layers of different refractive indices. In either case, however, it includes at least one region having a refractive index $n_{clad}$. In a portion of the optical fiber external to the housing, the cladding is surrounded by a polymer coating having a refractive index $n_{poly}$.

The index $n_{poly}$ is less than $n_{clad}$ by an amount sufficient for light of at least one operating wavelength of the optical assembly to be confined within the cladding as a guided mode of the cladding. By "guided mode of the cladding", I mean any guided mode that is optically confined within a region larger than but containing the core, and that can be coupled out of the cladding by contact with an adjacent medium of sufficiently high refractive index. Accordingly, guided modes of the cladding are meant to include not only pure cladding modes, but also modes that may be affected by material regions near, but not part of, the cladding.

Our new optical assembly includes an optical medium that is effective at one or more operating wavelengths to guide light, along the fiber axis but substantially outside of the fiber core, from the interior to the exterior of the housing. By "substantially outside of the fiber core" we mean in any mode or combination of modes that are not exclusively core modes, and that may include modes of material regions lying outside the cladding.

Our new optical assembly includes a transition region external to the housing, where at least one optical mode guided by the abovesaid optical medium transitions to at least one optical mode confined by the polymer coating as a guided mode of the cladding.

BRIEF DESCRIPTION OF THE DRAWING

FIG. 3 is intended purely for pedagogical purposes, and not to illustrate the details of a practical implementation, such as would be apparent to those skilled in the art. The figure is not drawn to scale.

DETAILED DESCRIPTION

Figure 1:
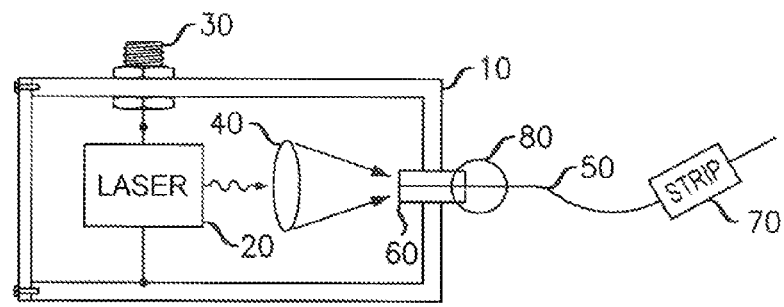
FIG. 1 is a schematic drawing of a typical optical assembly of the prior art, including a device package and a pigtail fiber coming out of the device package. The represented components within the device package are merely illustrative and not meant to be limiting. In the following figures, elements common to FIG. 1 are designated with like reference numerals.

As noted above, the location where a pigtail fiber emerges from an optical device package is particularly subject to thermal damage due to stray light. Such a location is indicated in FIG. 1 by circle 80.

One mechanism that can lead to such thermal damage is conveniently described with reference to FIG. 2, which shows an expanded view of the region indicated in FIG. 1 by circle 80. (FIG. 2 additionally contains features that depart from the prior art, as explained below.) As seen in the figure, optical fiber 50 has a glass core 110 and a glass cladding 120. The fiber passes through a bore in ferrule 130. For reasons to be explained below, ferrule 130 as shown in the figure includes outer portion 140 and inner portion 150. The portion of fiber 50 that passes through the bore is bare; that is, the glass portions are stripped of any polymer coating. By contrast, the portion of fiber 50 that lies outside of the housing and extends downstream will typically include a polymer coating 170 having an inner portion 171 and an outer portion 172.

Typical optical fibers have a polymer coating comprising two layers, as illustrated. Often, both the inner layer and the outer layer have relatively high refractive indices and relatively high optical absorption coefficients. However, low index fibers as discussed above will typically have an inner coating of low refractive index, although the outer coating will typically be of the conventional high-index, high-absorption type. (An optical fiber that has more than two layers of polymer coating may likewise have an innermost coating of low refractive index.)

Local heating, leading to thermal damage, tends to arise when stray light escapes from the cladding near the optical discontinuity that is formed by the beginning of the fiber portion that is overlain by polymer coating 170. That is, the polymer coating as noted typically has a refractive index greater than that of the cladding. As a consequence, such optical confinement within the cladding that may be present due to a reduced refractive index outside the cladding is lost at or near the point where the polymer coating starts. In that region, optical power tends to couple out of cladding modes and into the polymer coating.

There also may be stray light that is not guided within the cladding, but that subsequently couples into the polymer coating. This may include light in non-guided modes within the cladding, as well as light that is guided in surrounding materials of higher refractive index than the cladding.

An example of such high-index materials is provided by some optical adhesives used to fix the optical fiber within the bore. Because such adhesives typically have a relatively high refractive index, it is possible for light to couple from the cladding into the adhesive, and then to couple from the adhesive into the polymer coating.

Moreover, if a surrounding high-index material ends abruptly near where the polymer coating start, the light guided in the high-index material will tend to scatter outside of the cladding and is then liable to be captured by the polymer coating. Even if light is well confined by the cladding where the fiber passes through the ferrule, a short air gap between the outer face of the ferrule and the beginning of the polymer coating may constitute a sufficient optical discontinuity to scatter light out of the cladding and into the polymer coating.

Turning again to FIG. 2, it will be seen that, as noted above, optical fiber 50 includes core 110 and cladding 120. The cladding may consist of a single material layer, or it may include two or more layers having different refractive indices. In all cases, however, the cladding will have at least an outermost layer of refractive index $n_{clad}$.

As seen in the figure, ferrule 130 contains a bore, through which fiber 50 extends from the interior to the exterior of the housing. In an embodiment of the invention, at least a portion of ferrule 130 consists of material having low optical absorption at the operating wavelength or wavelengths, and having a refractive index that is less than $n_{clad}$.

The ferrule may optionally be entirely composed of such a material. Alternatively, as shown in FIG. 2, the ferrule may have an outer portion 140 of any suitable composition, and an inner portion 150 having a low-absorption, low-index composition as described above. Portion 150 should extend inward to the walls of the bore, and its thickness and its refractive index depression relative to the fiber cladding should be sufficient to define cladding modes able to confine and to guide light at one or more operating wavelengths. A preferable thickness is at least 10 micrometers, and more preferably, at least 15 micrometers.

In this regard, a material has low optical absorption if it has an attenuation coefficient $\alpha$ less than $0.1$ cm$^{-1}$, and preferably less than $0.05$ cm$^{-1}$.

Within the bore, the gap between the optical fiber and the ferrule is at least partially filled with optical adhesive 160. Adhesives for optical fibers having various refractive indices are known. However, in accordance with a first embodiment of the invention, the adhesive should have both low optical absorption and a refractive index less than $n_{clad}$. (The refractive index of the adhesive is desirably chosen to be less than $n_{clad}$ over the entire anticipated operating temperature range of the associated optical device.)

Adhesives that have refractive indices sufficiently low for use with at least some optical fibers are commercially available. One example is AngstromBond® R221, which is an optical quality adhesive having a refractive index of 1.41. It is available from Fiber Optic Center, Inc. of New Bedford, Mass.

It should be noted that air may be present in the space between the fiber cladding and the ferrule if, for example, the space is only partially filled with adhesive. Air is also a low-absorption, low-index medium, and as such, it can also help to support confined cladding modes.

In some cases, it may alternatively be possible to bring the ferrule into direct contact with the fiber cladding, thus excluding both adhesive and air. This may be done, for example, if the fiber cladding and the ferrule are fused together.

Figure 2:
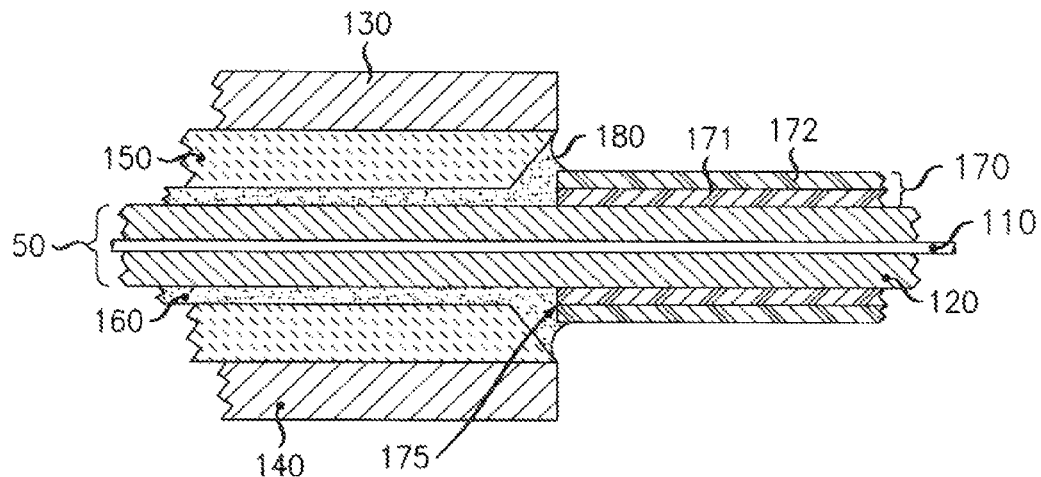
FIG. 2 is a detail of an optical assembly, illustrating features of the invention in one embodiment. The figure is not drawn to scale.

With further reference to FIG. 2, it will be seen that the outward-facing end of the bore in ferrule 130 is countersunk with a conical taper. The tapered opening is useful for capturing the end of the bare section of optical fiber for insertion through the ferrule during assembly. The tapered opening is also useful for facilitating the application of adhesive to the bore prior to inserting the fiber. In typical assembly procedures, end 175 of polymer coating 170 is brought to a final position that lies within the tapered opening, but without abutting contact with the ferrule.

In accordance with the first embodiment of the invention, at least the inner portion 171 of polymer coating 170 has low optical absorption (as defined above) and has a refractive index that is less than $n_{clad}$. Polymer coating compositions suitable for use with at least some optical fibers are commercially available. By way of example, a typical low-index coating has a refractive index of 1.38. By contrast, polymer coatings lying near the high end of the available range may, e.g., have a refractive index of 1.48.

With further reference to FIG. 2, it will be seen that within the conical taper, adhesive 160 forms a mass that engulfs end 175 of the polymer coating and extends continuously to make contact with the outer face of the ferrule. Such a mass is readily formed during assembly by applying a sufficient quantity of adhesive to the bore opening within the conical taper prior to inserting the fiber.

It will be understood from reference to FIG. 2 that the portion of adhesive 160 that lies within the bore together with ferrule portion 150, the portion of adhesive 160 that lies within the conical taper, and polymer coating 170 form an optically continuous medium surrounding cladding 120. If the effective refractive index of this continuous medium is sufficiently depressed relative to $n_{clad}$, there will be good confinement of stray light within the fiber cladding. As a consequence, the fiber cladding can guide the stray light downstream to a cladding-mode optical power stripper, where the stray light can be removed safely.

An illustrative example applying the above-described principles uses a single-mode fiber having a core diameter of 10 micrometers and a cladding diameter of 125 micrometers. The core refractive index is 1.45, the cladding refractive index is 1.445, the ferrule (i.e., at least portion 150 of the ferrule) refractive index is 1.43, the adhesive refractive index is 1.41, and the polymer cladding refractive index is 1.38. Of course, many other combinations of fiber designs and material properties can be found that similarly apply the principles described here to achieve the benefits of the invention.

Figure 3:
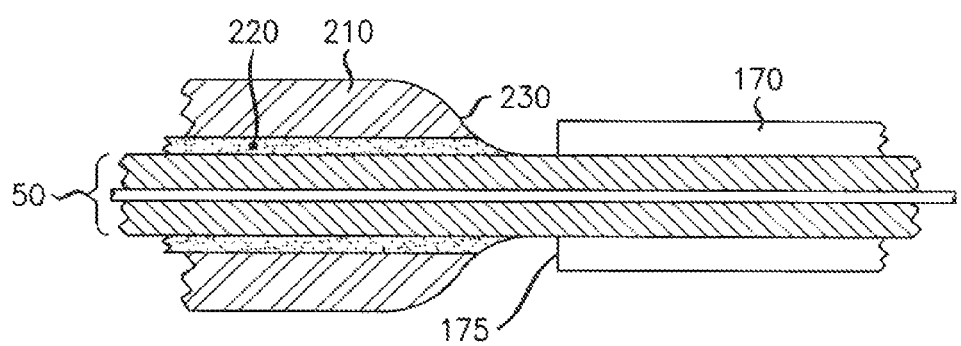
FIG. 3 is a detail of an optical assembly, illustrating features of the invention in an alternate embodiment.

A second embodiment of the invention is illustrated in FIG. 3. With reference to the figure, fiber 50 and polymer coating 170 are as described above. Element 210 of the figure represents an inner portion of ferrule 130 or, alternatively, the entire body of the ferrule. In either event, ferrule body 130 contains a bore as described above. Fiber 50 is fixed within the bore using an optical adhesive that now has a refractive index that is greater than or equal to $n_{clad}$. The refractive index of ferrule body 210 is less than the adhesive refractive index. Alternatively, ferrule body 210 likewise has a refractive index greater than or equal to $n_{clad}$, but is surrounded by a region of lower refractive index.

In one possible method of assembly, ferrule body 210 is provided as a sleeve. The fiber is fixed within the ferrule body. Further shaping may then be done on the ferrule body. The ferrule body is then inserted and fixed within a larger bore in the surrounding portion of the ferrule.

In the high-index regions constituted by adhesive 220 and optionally by ferrule body 210 have sufficiently low optical absorption, are suitably dimensioned according to well-known principles, and are surrounded by a suitable thickness of lower-index material, they will guide stray light from the interior to the exterior of the housing. Unlike the first embodiment, the second embodiment will guide the stray light at least partially within the medium external to the fiber cladding.

Outside the housing, it is desirable to couple the stray light into the fiber cladding before reaching end 175 of the polymer coating. If that coupling can be achieved with high efficiency, the stray light can be safely conducted to the cladding-mode optical power stripper for disposal.

As illustrated in FIG. 3, the desired coupling may be effectuated by taper 230. The taper is desirably made gradual enough to be adiabatic, according to well-known principles of optical design. The medium surrounding the taper may be air, or a different region having a refractive index lower than $n_{clad}$.

If the high-index region that guides the stray light within the ferrule is composed solely by the optical adhesive, the taper may be formed by suitably shaping the body of optical adhesive lying outside of the bore. If, e.g., a sleeve or other ferrule body cooperates with the adhesive for guiding the stray light, such sleeve or other ferrule body is also advantageously shaped to smoothly and gradually reduce its diameter in the taper region.

As noted above, the end face of the optical fiber within the housing is typically made flush with the inward face of the ferrule. Accordingly, the adaptations to the adhesive layer and the ferrule described above in reference to the first illustrative embodiment begin at the inward face of the ferrule. Similarly, the adaptations to the adhesive layer and the ferrule described above in reference to the second illustrative embodiment also begin at the inward face of the ferrule. We note here, however, that the above-described adaptations may begin after a short setback without substantially impairing the performance of the invention. Thus, the inward end of the optical fiber may, for example, extend toward the optical device through a short end cap having properties different from those described above, or it could be bonded to the ferrule for a short distance using a high-index adhesive.

Figure 4:
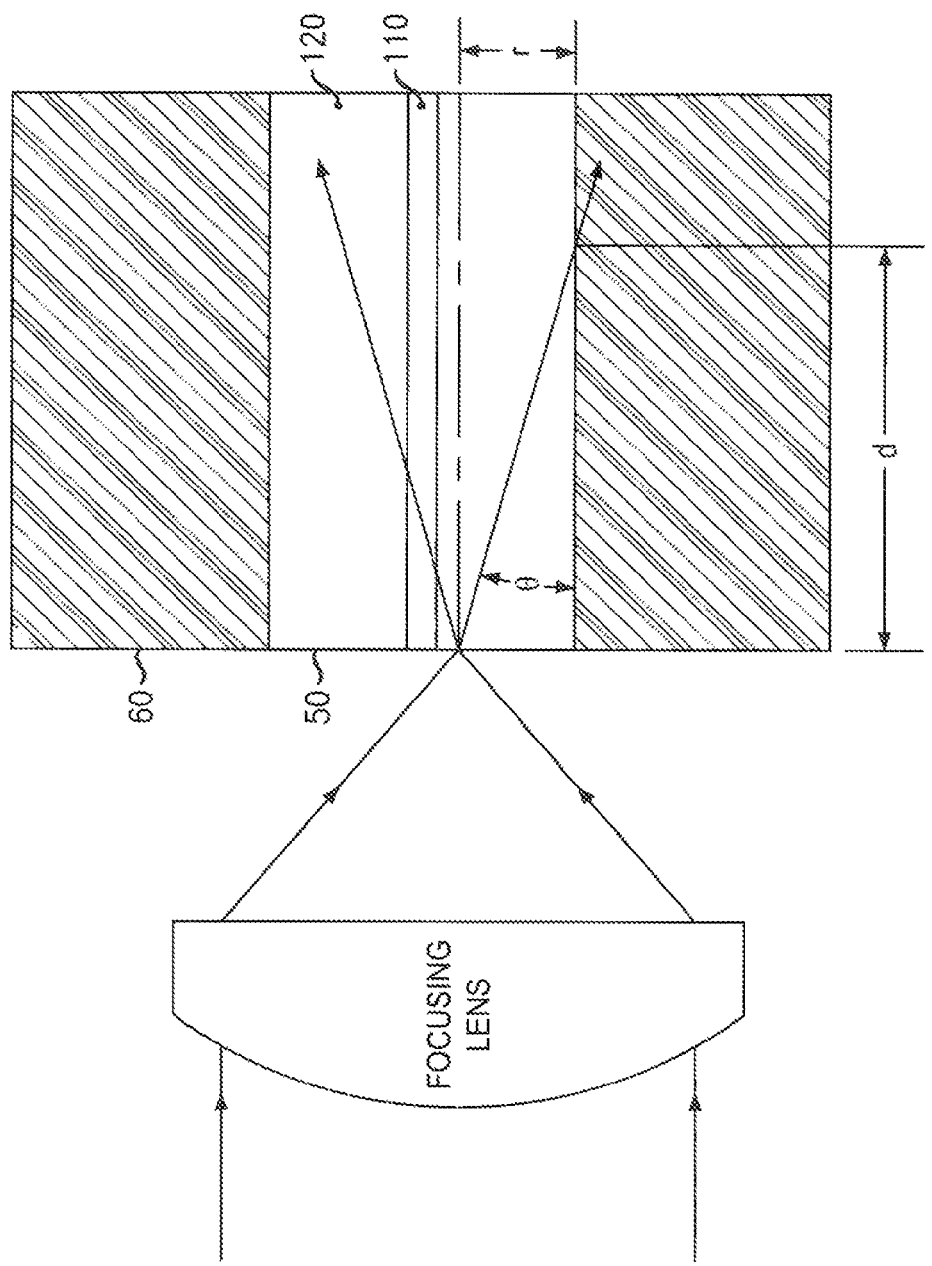
FIG. 4 is a detail of an optical assembly, including a geometrical construction illustrating the numerical aperture of the optical fiber. The figure is not drawn to scale.

The above discussion is better understood with reference to FIG. 4. As shown there, the end of an optical fiber will accept rays of injected light (according to a description based on geometrical optics) only if they fall within a cone having a half-angle $\theta$. The quantity $\sin \theta$ is the numerical aperture of the fiber.

Suppose that stray light entering the fiber misses the core by a small amount and instead enters the cladding. For purposes of illustration, I assume that the fiber has a core diameter of 10 micrometers and a cladding diameter of 125 micrometers, and that the stray light impinges the end of the fiber at a radial distance r of 55 micrometers from the interface between the cladding and the ferrule, as shown in the figure. Assuming further that the fiber has a typical numerical aperture of 0.12 (corresponding to an acceptance half-angle of $\sin^{-1} 0.08$ within the glass), FIG. 4 indicates that the stray light will begin to reach the cladding at a depth d along the fiber axis of about $(1/0.08) \times 55$ micrometers=690 micrometers. This provides a rough indication of the depth to which there is relatively little danger of coupling the stray light out of the cladding by surrounding higher-index materials.

Those skilled in the art will appreciate that numerous other implementations are possible that fall within the scope of the present invention. For example, implementations are possible in which the material properties of the housing provide a low-index region, and the optical fiber passes through a bore made directly in the housing wall, without the use of a ferrule. In another example, a low-index region surrounding the fiber cladding is provided by at least an inner portion of the ferrule, but the optical adhesive has a refractive index that is the same as, or is greater than, that of the cladding. Such an arrangement may still be operative if, for example, the thickness of the adhesive layer is less than one micrometer.

What is claimed is:

1. An optical assembly having one or more operating wavelengths and comprising a housing and an optical fiber that has a longitudinal axis and that extends from the interior to the exterior of the housing, wherein:
   (a) the optical fiber has a core and a cladding surrounding the core, and the cladding has at least one region having a refractive index $n_{clad}$;
   (b) in a portion of the optical fiber external to the housing, the cladding is surrounded by a polymer coating having a refractive index $n_{poly}$ that is less than $n_{clad}$ by an amount sufficient for light of at least one said operating wavelength to be confined within the cladding as a guided mode of the cladding;
   (c) an optical medium is included that is effective to guide light of at least one said operating wavelength along the fiber axis from the interior to the exterior of the housing substantially outside of the fiber core; and
   (d) the optical assembly includes a transition region external to the housing, where at least one optical mode guided by said optical medium transitions to at least one optical mode confined by the polymer coating as a guided mode of the cladding;
   wherein the optical medium effective to guide light from the interior to the exterior of the housing comprises the fiber cladding and at least one material region external to the cladding that has a refractive index less than $n_{clad}$, such that the guided light is confined in a cladding mode, and, wherein the material region having a refractive index less than $n_{clad}$ includes at least one space filled with air.

2. The optical assembly of claim 1, wherein the optical assembly further comprises a ferrule passing through a wall of the housing, the optical fiber passes through a bore in the ferrule, and the external material region comprises at least an inner portion of the ferrule.

3. The optical assembly of claim 2, wherein the external material region further comprises a layer of adhesive material in the bore between the optical fiber and said inner ferrule portion.

4. The optical assembly of claim 3, wherein the transition region comprises a mass of said adhesive material in contact with the ferrule and with the polymer coating.

5. The optical assembly of claim 1, wherein the at least one material region overlies the cladding that has a refractive index at least $n_{clad}$, such that the guided light is confined in a mode at least partially of the overlying material region.

6. The optical assembly of claim 5, wherein the optical assembly further comprises a ferrule passing through a wall of the housing, the optical fiber passes through a bore in the ferrule, and the external material region comprises at least an inner portion of the ferrule.

7. The optical assembly of claim 6, wherein the external material region further comprises a layer of adhesive material in the bore between the optical fiber and said inner ferrule portion.

8. The optical assembly of claim 5, wherein the fiber cladding has a diameter, the transition region comprises a portion of the external material region that tapers from a higher initial diameter to the cladding diameter, and the taper is gradual enough to effectuate said transition between the guided optical modes.

9. The optical assembly of claim 1, further comprising a cladding mode power stripper optically coupled to the optical fiber at a position downstream of the transition region.

10. The optical assembly of claim 1, wherein the polymer coating having a refractive index $n_{poly}$ is the innermost of two or more polymer layers.

* * * * *